Patented Mar. 22, 1938

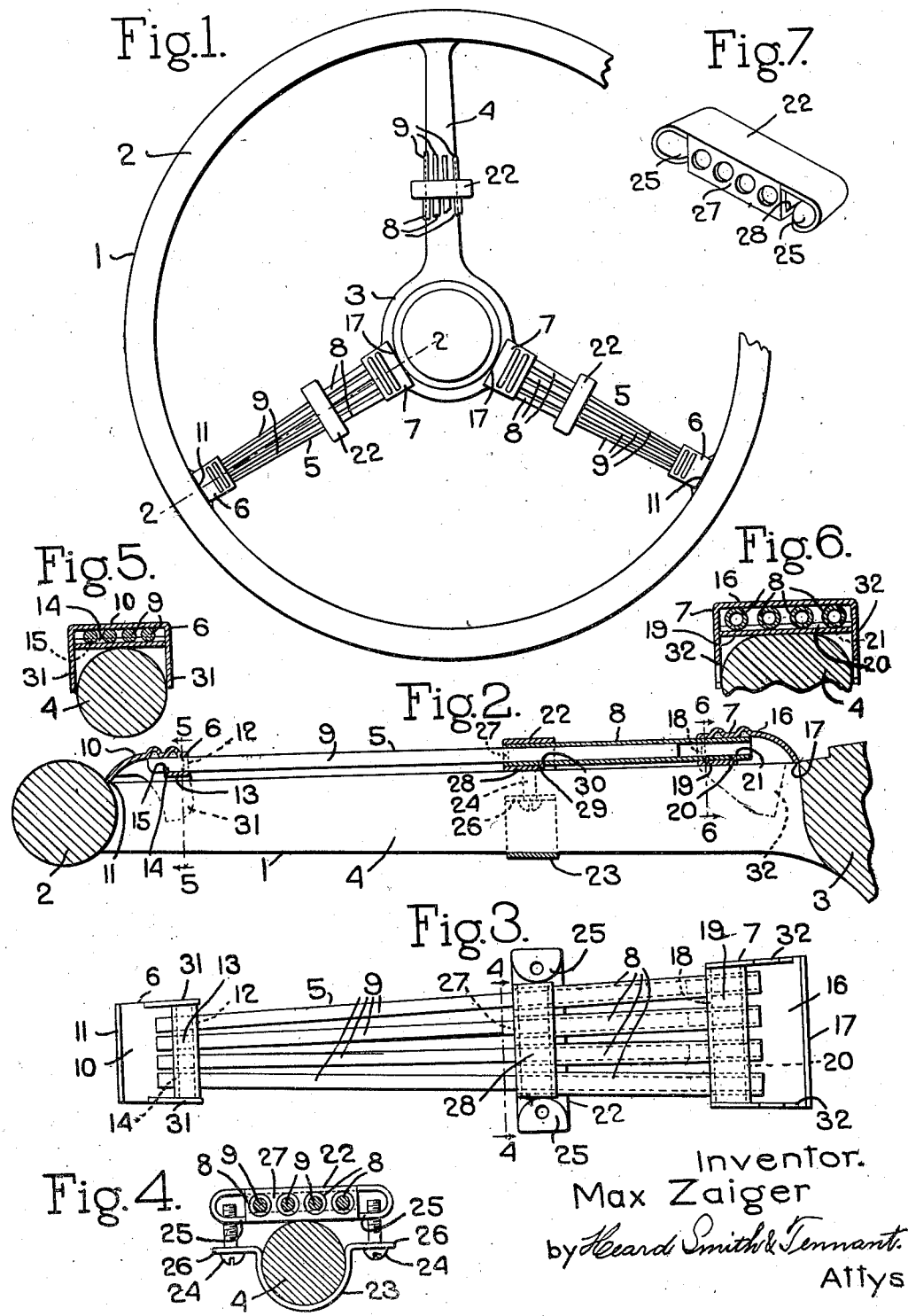

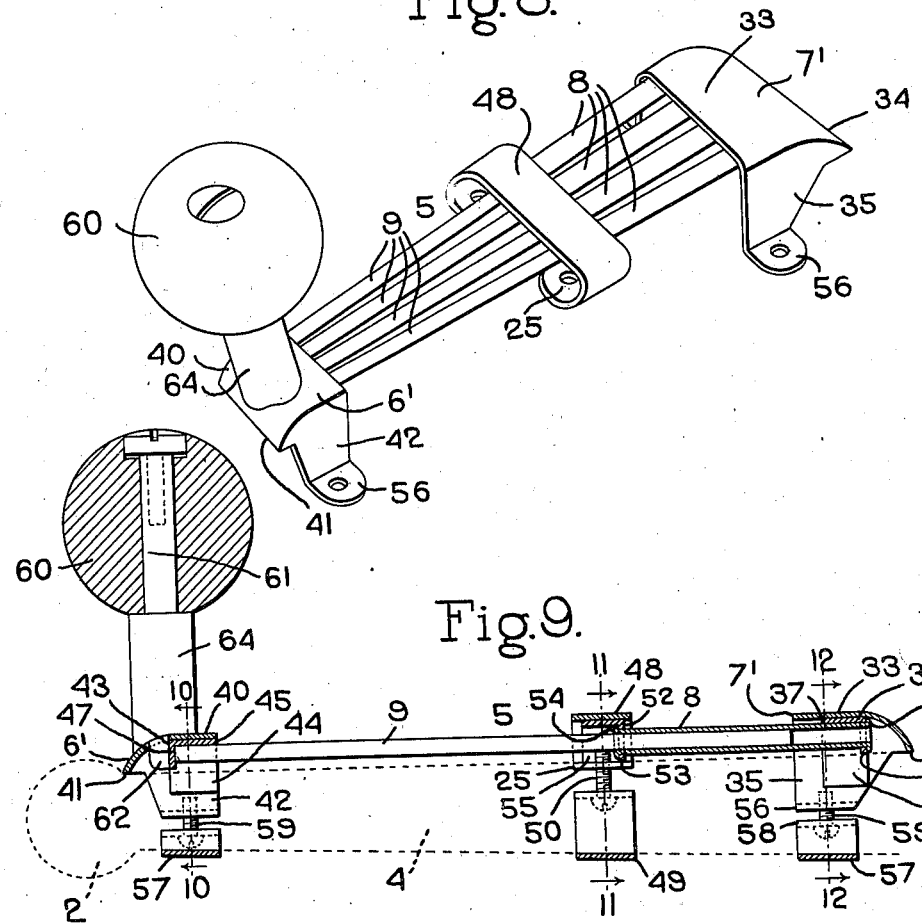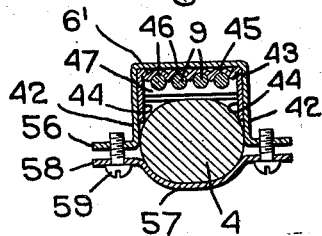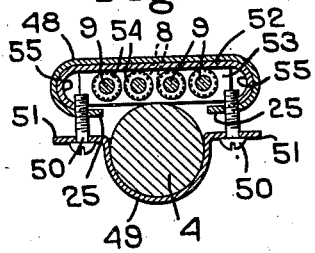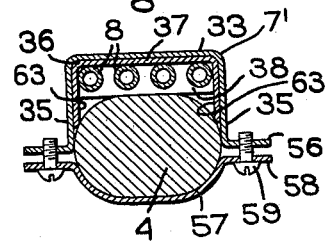
Inventor.
Max Zaiger

2,112,057

UNITED STATES PATENT OFFICE 2,112,057

STEERING WHEEL

Max Zaiger, Lynn, Mass.

Application December 30, 1936, Serial No. 118,227

14 Claims. (Cl. 74—557)

This invention relates to steering wheels for automobiles and has for its object to provide a novel attachment or accessory which can be readily applied to the spokes of an ordinary steering wheel in order to give it the appearance of a steering wheel in which the spokes are each made up of a plurality of wires or rod-like members.

Another object of the invention is to provide an attachment or accessory of this type which is constructed so that it can be readily applied to automobile wheels having spokes of different lengths.

A further object of the invention is to provide an attachment of the above type which is made with a steering knob so that when the attachment is secured to the steering wheel the knob may be used for steering purposes.

The attachment embodying the invention comprises a plurality of extensible rod-like members having a general parallel arrangement and adapted to overlie the spoke of the steering wheel and be clamped thereto. The rod-like members for each spoke are provided at each end with a head member having wings which partially embrace the spoke, one head member fitting against the rim of the steering wheel and the other against the hub. The attachment can be easily and quickly applied to the spoke of the steering wheel, and when in place it gives the steering wheel the appearance of one that is made with the wire spokes.

In order to give an understanding of the invention I have illustrated in the drawings a selected embodiment thereof which will now be described after which the novel features will be pointed out in the appended claims.

In the drawings;

Fig. 1 is a plan view of a steering wheel having my attachment applied thereto but with parts broken out;

Fig. 2 is an enlarged section on the line 2—2, Fig. 1;

Fig. 3 is an under side view of the attachment;

Fig. 4 is a transverse section through a spoke with the attachment applied thereto, the section on the attachment being on the line 4—4, Fig. 3;

Fig. 5 is a section on the line 5—5, Fig. 2;

Fig. 6 is a section on the line 6—6, Fig. 2;

Fig. 7 is a perspective view of the upper clamping member;

Fig. 8 is a perspective view of an attachment having a somewhat different construction from that shown in Figs. 1 to 7;

Fig. 9 is a longitudinal sectional view of the embodiment shown in Fig. 8;

Fig. 10 is a section on the line 10—10, Fig. 9;

Fig. 11 is a section on the line 11—11, Fig. 9; and

Fig. 12 is a section on the line 12—12, Fig. 9.

Referring to the drawings 1 indicates generally the steering wheel of an automobile which is provided with the usual rim 2 and hub 3 which are connected by spokes 4.

My improvements comprise an attachment adapted to be applied to each spoke and which, as stated above, will give the spoke the appearance of a spoke made up of a plurality of parallel rod-like members or wires.

Referring first to the construction shown in Figs. 1 to 7, the attachment for each spoke comprises a plurality of rod-like members 5 which are preferably made extensible, and which are connected at their outer ends by an outer head or end member 6 and at their inner ends by an inner head or end member 7. As stated above each rod-like member is preferably made extensible, this being accomplished by forming it of the two sections 8 and 9 which have a telescopic relation, the section 8 being in the form of a tube and the section 9 being in the form of a rod or wire telescoping into the tube. The outer head or end member 6 is formed from sheet metal and presents an upper portion 10 and depending wings 31 to embrace the sides of the spoke, the outer edge 11 of the head fitting against the inside of the rim 2 of the steering wheel. At the inner side said head 6 is formed with a depending flange or end wall 12 having openings through which the sections 9 of the extensible rod-like members extend.

These rod-like members may be rigidly secured to the head 6 in any appropriate way. One simple way is illustrated in Figs. 2 to 7 wherein said head 6 is shown as provided with a flange 13 extending inwardly from the lower edge of the end wall 12 and underlying the ends of the rod sections 9, the edge of the flange 13 being upturned as shown at 14 and entering a recess 15 formed in the under side of each rod section 9.

The inner head 7 which is at the hub end of the attachment may have a similar construction. It is preferably formed from sheet metal and as shown in Figs. 2 to 7 it presents a top portion 16 and depending wings 32 which embrace the sides of the spoke. The edge 17 of the top portion 16 fits against the hub, and said head is also formed with the depending end wall 18 having openings through which the ends of the rod sections 8 extend. The rod sections 8 are anchored in the head 7 in the same way that the rod sections 9 are anchored in the head 6, that is, by forming the head with a horizontal flange 19 extending from the lower edge of the end wall 18 and underlying the ends of the rod sections 8, the edge of the flange 19 being upturned as shown at 20 and entering a recess 21 formed in the under side of the rod sections 8.

This construction provides an extensible spoke attachment which can be adjusted to the length of the spoke of any steering wheel.

Means are provided for clamping the attachment to the spoke. The clamp herein shown comprises two strap-like clamping members 22 and 23 which are connected by clamping screws 24. The clamping member 22 overlies and is connected to the ends of the tubular rod sections 8 and is formed with wings 25 to which the clamping screws 24 are screwed. The clamping member 23 encircles the underside of the spoke 4 and has the lateral flanges 26 through which the clamping screws 24 extend. The clamping member 22 is connected to the tubular rod sections 8 in the same manner that the heads 6 and 7 are and as herein shown said member 22 is formed with a vertical end wall 27 having openings through which the tubular rod sections 8 extend, and the bottom of the end wall 27 is formed with a horizontal flange 28, the end of which is upturned at 29 to enter recesses 30 formed in the under side of the tubular members 8. The attachment may be described as comprising two sections having a telescopic relation, one section comprising the end member 6 and the rod sections 9, and the other section comprising the end member 7 and the tubular rod sections 8. The ends of the tubular rod sections 8 come flush with the end wall 27 of the strap-like member 22 as clearly seen in Fig. 2, and the strap-like member thus conceals the juncture between the two sections of the attachment.

In Figs. 8 to 12 I have shown an attachment embodying the invention but having a slightly different construction from that shown in Figs. 1 to 7. In said Figs. 8 to 12 the rod-like members are indicated at 5 and each is shown as comprising the two sections 8 and 9 having the telescoping relation, the section 8 being a tubular section and the section 9 a rod section. The head at the rim end of the attachment is designated 6' and that at the hub end of the attachment 7'. Each head is preferably formed of sheet metal and the head 7' has the upper portion 33 which is preferably curved slightly so that the edge 34 thereof meets the hub of the wheel. Said head is also formed with side wings 35 which embrace the spoke.

The tubular sections 8 are secured to the head 7' through the medium of an anchoring member 36, the latter being formed of sheet metal shaped to present an angle-iron body having the horizontal leg 37 underlying the portion 33 of the head 7' and the vertical leg 38 provided with apertures through which the tubular sections 8 extend. The ends of the tubular sections 8 are headed over as shown at 39 thereby rigidly connecting the tubular sections to the anchoring member 36. Said anchoring member 36 is formed with end wings 63 which are spot-welded or otherwise secured to the side wings 35 of the head 7'.

The head 6' is formed with the upper portion 40 having the edge 41 which engages the rim 2 of the steering wheel, and also with the depending side wings 42 which embrace the sides of the spoke. Situated within the member 6' is an angle-shaped member 43 having end wings 44 which are spot-welded to the side wings 42. The horizontal leg 45 of the angle-shaped member 43 is fluted to the present grooves 46 in which the ends of the rod sections 9 are received. These rod-like sections may be welded to the member 43. The extremities of the rod-like members 9 engage the flange or leg 47 which acts as a positioning flange for positioning the parts when they are assembled preparatory to the welding operation. In this embodiment of the invention I propose to provide means for clamping the attachment to the spoke not only at the central portion thereof but also at each end. The central clamp comprises the two clamping members 48 and 49 which are connected together by the clamping screws 50. The upper clamping member 48 is rigidly secured to the tubular sections 8 and its general construction is the same as that of the clamping member 22 in Figs. 1 to 7. This clamping member 48 is formed with the two wings 25 with which the clamping screws 50 have screw-threaded engagement and the clamping member 49 is provided with the wings 51 through which the screws extend.

The tubular sections 8 are secured to the upper clamping member 48 through the medium of an anchoring member 52 which is similar in construction to the anchoring member 36 in that it presents an angle-shaped body, the vertical flange 53 of which has openings through which the ends of the tubular rods 8 extend, the extremities of the latter being headed over as shown at 54. This anchoring member 52 is provided with end wings 55 which are spot-welded to the ends of the clamping member 48.

I have shown herein a clamping device associated with each of the heads 6', 7' for clamping the attachment to the spoke, the side wings 42 of the head 6' and the side wings 35 of the head 7' being bent outwardly at their lower ends to form ears 56. Associated with each head is an under clamping member 57 fitting underneath the spoke and having ears 58 at its ends which mate the ears 56. 59 indicate clamping screws extending through the ears 58 and screwing through the ears 56 and by which the heads are clamped to the spoke. The embodiment shown in Figs. 8 and 12 may also be described as an attachment formed in two sections having a telescopic relation, one section comprising the end member 6' and the rod sections 9 connected thereto, and the other section of the attachment comprising the end member 7' and the tubular sections 8 attached thereto. In this embodiment also the strap-like clamping member 48, which is attached to the outer ends of the tubular sections 8, conceals the juncture between the two sections of the attachment.

If desired the head 6' of the attachment for one of the spokes may be provided with a steering knob 60 by which the wheel may be manipulated in steering the automobile. This steering knob is shown as mounted on and freely rotatable about the reduced end 61 of a spindle or stem 64 which is rigidly secured to the head 6'. As herein shown the lower end of the stem 64 has a projection 62 which extends through an opening in the head 6' and is in engagement with the positioning wall 47. The stem 64 may be welded to the head 6' and the projection 62 may also be welded to the wall 47 thereby making a solid connection.

The steering wheel herein shown is provided with straight radial spokes but it will be understood that if the steering wheel is of the type having curved spokes, the rod members 5 will be curved to conform to the curvature of the spoke.

I claim:

1. An attachment for an automobile steering wheel spoke, comprising a plurality of rod-like elements adapted to extend longitudinally of and overlie the spoke, a head member at each end of each attachment rigidly secured to the rod-like members, each head member having side wings embracing the spoke, and a clamping member connected to the side wings of each head member for clamping the attachment to the spoke.

2. An attachment for the spoke of an automobile steering wheel comprising a plurality of substantially rod-like elements, each comprising a tubular section and a rod section having a telescopic relation, a head member at each end of the attachment, each head member comprising an upper portion and depending wings to embrace the spoke, an anchoring member for one head having a vertical flange through which the ends of the tubular rod sections extend and to which they are anchored, an anchoring member rigid with the other head and having grooves to receive the ends of the rod sections, and a positioning flange to engage the ends of said rod sections, said rod sections being welded to the anchoring member, and means to clamp the attachment to a spoke.

3. An attachment for the spoke of an automobile steering wheel comprising a plurality of substantially rod-like elements, each comprising a tubular section and a rod section having a telescopic relation, a head member rigidly secured to the outer end of the tubular sections and having depending wings to embrace the spoke of the wheel, a clamping member rigidly secured to the end of the tubular sections into which the rod sections telescope, a second head member rigidly secured to the outer end of the rod sections, and means associated with each head member and said clamping member for clamping the attachment to a spoke.

4. An attachment for an automobile steering wheel spoke, comprising a plurality of rod-like elements adapted to extend longitudinally of and overlying the spoke, a head member at each end of the attachment to which the rod-like members are connected, means associated with each head member for clamping the attachment to the spoke and a steering knob secured to the attachment.

5. An ornamental attachment for an automobile steering wheel spoke, comprising a plurality of rod-like elements arranged in substantially the same horizontal plane and adapted to extend longitudinally of and overlie the spoke, a head member at each end of the attachment to which the rod-like members are connected, and means associated with each head member for clamping the attachment to the spoke.

6. An ornamental attachment for an automobile steering wheel spoke, comprising a plurality of rod-like elements arranged in substantially the same horizontal plane and adapted to extend longitudinally of and overlie the spoke, and means to clamp the attachment to the spoke.

7. An ornamental attachment for an automobile steering wheel spoke comprising end members adapted to adjoin the hub and rim portions of the steering wheel, together with a plurality of rod-like spoke elements arranged in substantially the same horizontal plane and extending between said end members, and means for securing said attachment to the spoke with said spoke elements extending longitudinally of and overlying said spoke.

8. An ornamental attachment for an automobile steering wheel spoke comprising end members adapted to adjoin the hub and rim portions of the steering wheel, together with a plurality of rod-like spoke elements arranged in substantially the same horizontal plane and extending between said end members, means for adjusting said attachment as to length, and means for securing said attachment to the spoke with said spoke elements extending longitudinally of and overlying said spoke.

9. An ornamental attachment for an automobile steering wheel spoke comprising end members adapted to adjoin the hub and rim portions of the wheel respectively, together with a plurality of rod-like spoke elements arranged in substantially the same horizontal plane and extending between said end members, said attachment being formed of a plurality of sections relatively adjustable in the direction of the length of said rod-like elements thereby to vary the effective length of the attachment, and means for securing the attachment to the spoke with said spoke elements extending longitudinally of and overlying said spoke.

10. An ornamental attachment for an automobile steering wheel spoke comprising end members adapted to adjoin the hub and rim portions of the wheel respectively, together with a plurality of rod-like spoke elements arranged in substantially the same horizontal plane and extending between said end members, said attachment being formed of a plurality of longitudinally extending telescoping sections and being thereby adjustable as to length, and means for securing the attachment to the spoke with said spoke elements extending longitudinally of and overlying said spoke.

11. An ornamental attachment for an automobile steering wheel spoke comprising end members adapted to adjoin the hub and rim portions of the wheel respectively, together with a plurality of rod-like spoke elements extending between said end members and arranged in substantially the same horizontal plane, said attachment being composed of a plurality of sections with said spoke elements of one section telescoping with the spoke elements of the other section and affording the attachment longitudinal adjustability, and means for securing the attachment to the spoke with the spoke elements extending longitudinally of and overlying said spoke.

12. An ornamental attachment for an automobile steering wheel spoke comprising end members adapted to adjoin the hub and rim portions of the steering wheel, together with a plurality of rod-like spoke elements extending between said end members and arranged in substantially the same horizontal plane, said attachment being formed of a plurality of longitudinally extending telescoping sections and being thereby adjustable as to length, means attached to one of said sections and overlying and concealing the juncture with that section of the other section, and means for securing the attachment to the spoke with the spoke elements extending longitudinally of and overlying said spoke.

13. An ornamental attachment for an automobile steering wheel spoke comprising end members adapted to adjoin the hub and rim portions of the steering wheel, together with a plurality of rod-like spoke elements extending between said end members and arranged in substantially the same horizontal plane, said attachment being formed of a plurality of longitudinally extending telescoping sections and being thereby adjustable as to length, means attached to one of said sections and overlying and concealing the juncture with that section of the other section, and means connected and cooperative with said concealing means for securing said attachment to a spoke with the spoke elements extending longitudinally of and overlying said spoke.

14. An ornamental attachment for an automobile steering wheel spoke comprising a pair of longitudinally adjustable members, one of said members having at one end an end member and at the other end a transverse strap-like element, and a plurality of hollow rod-like spoke elements extending between and having their ends respectively underlying the said strap-like element and end member, said second member comprising an end member and a plurality of rod-like spoke elements projecting from said end member and adapted to be slidingly inserted in the hollow spoke elements of the other member at the end of the latter defined by said strap-like element, said end members being adapted in assembly to occupy positions adjacent the hub and rim portions of the wheel respectively, and a clamping element adjustably connected to and underlying said strap-like member and constituting a means for securing the attachment to the spoke with the spoke elements extending longitudinally of and overlying said spoke.

MAX ZAIGER.